United States Patent
Koopmans

(10) Patent No.: US 7,194,996 B2
(45) Date of Patent: Mar. 27, 2007

(54) INTERNAL COMBUSTION ENGINE AND METHOD FOR AUTO-IGNITION OPERATION OF SAID ENGINE

(75) Inventor: Lucien Koopmans, Hovås (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/331,917

(22) Filed: Jan. 13, 2006

(65) Prior Publication Data
US 2006/0174853 A1 Aug. 10, 2006

(30) Foreign Application Priority Data
Jan. 13, 2005 (EP) .................................. 0500550

(51) Int. Cl.
*F02B 3/04* (2006.01)
(52) U.S. Cl. ....................... 123/295; 123/299; 123/305
(58) Field of Classification Search ................ 123/295, 123/299, 305
See application file for complete search history.

(56) References Cited
U.S. PATENT DOCUMENTS
6,422,200 B1 * 7/2002 Morikawa et al. .......... 123/305

6,499,458 B1  12/2002 Nieberding
6,971,365 B1 * 12/2005 Najt et al. .................. 123/305
2006/0016423 A1 *  1/2006 Kuo et al. .................. 123/299

FOREIGN PATENT DOCUMENTS

| DE | 10244365 | 4/2004 |
| EP | 1134398 | 9/2001 |
| EP | 1052391 | 4/2004 |
| EP | 1435442 | 7/2004 |

* cited by examiner

*Primary Examiner*—Erick Solis
(74) *Attorney, Agent, or Firm*—Julia Voutyras; Allan J. Lippa

(57) ABSTRACT

The invention relates to an internal combustion engine that can be operated in compression ignition mode, the engine comprising a fuel injector for each cylinder; a fuel injection controller for controlling fuel injection quantity and a piston in each cylinder whose compression action causes a mixture of air and fuel to be ignited. The engine is further provided with inlet and outlet valves and sensors for measuring various engine operating parameters. During compression ignition mode, the control unit controls the fuel injector to perform a first fuel injection before top dead center of the exhaust stroke during a period of negative valve overlap, and a second fuel injection during the piston compression stroke. The control unit may perform a switch between a first fuel injection strategy and at least one further fuel injection strategy in response to a change in load demand on the engine.

24 Claims, 6 Drawing Sheets

INTERNAL COMBUSTION ENGINE AND METHOD FOR AUTO-IGNITION OPERATION OF SAID ENGINE

TECHNICAL FIELD

The invention relates to an internal combustion engine that can be operated in a homogeneous charge compression ignition combustion mode, as well as a method for controlling such an engine.

BACKGROUND AND SUMMARY OF THE INVENTION

To improve thermal efficiency of gasoline internal combustion engines, lean burn is known to give enhanced thermal efficiency by reducing pumping losses and increasing ratio of specific heats. Generally speaking, lean burn is known to give low fuel consumption and low NOx emissions. There is however a limit at which an engine can be operated with a lean air/fuel mixture because of misfire and combustion instability as a result of a slow burn. Known methods to extend the lean limit include improving ignitability of the mixture by enhancing the fuel preparation, for example using atomised fuel or vaporised fuel, and increasing the flame speed by introducing charge motion and turbulence in the air/fuel mixture. Finally, combustion by auto-ignition, or homogeneous charge compression ignition, has been proposed for operating an engine with very lean or diluted air/fuel mixtures.

When certain conditions are met within a homogeneous charge of lean air/fuel mixture during low load operation, homogeneous charge compression ignition can occur wherein bulk combustion takes place initiated simultaneously from many ignition sites within the charge, resulting in very stable power output, very clean combustion and high fuel conversion efficiency. NOx emission produced in controlled homogeneous charge compression ignition combustion is extremely low in comparison with spark ignition combustion based on propagating flame front and heterogeneous charge compression ignition combustion based on an attached diffusion flame. In the latter two cases represented by spark ignition engine and diesel engine, respectively, the burnt gas temperature is highly heterogeneous within the charge with very high local temperature values creating high NOx emission. By contrast, in controlled homogeneous charge compression ignition combustion where the combustion is uniformly distributed throughout the charge from many ignition sites, the burnt gas temperature is substantially homogeneous with much lower local temperature values resulting in very low NOx emission.

Engines operating under controlled homogeneous charge compression ignition (HCCI) combustion have already been successfully demonstrated in two-stroke gasoline engines using a conventional compression ratio. The high proportion of burnt gases remaining from the previous cycle, i.e., the residual content, within the two-stroke engine combustion chamber is responsible for providing the hot charge temperature and active fuel radicals necessary to promote homogeneous charge compression ignition in a very lean air/fuel mixture. In four-stroke engines, because the residual content is low, homogeneous charge compression ignition is more difficult to achieve, but can be induced by heating the intake air to a high temperature or by significantly increasing the compression ratio. This effect can also be achieved by retaining a part of the hot exhaust gas, or residuals, by controlling the timing of the intake and exhaust valves.

In all the above cases, the range of engine speeds and loads in which controlled homogeneous charge compression ignition combustion can be achieved is relatively narrow. The fuel used also has a significant effect on the operating range; for example, diesel and methanol fuels have wider auto-ignition ranges than gasoline fuel. A further problem is to achieve ignition at a particular time with maintained combustion stability, while avoiding engine knocking and misfiring. This is a particular problem when operating the engine under HCCI combustion at low load.

Hence there exits a need for solving the problem of controlling the combustion timing when operating the engine at low load in HCCI-mode.

Accordingly, the present invention relates to a direct fuel injection (DI) internal combustion engine preferably, but not necessarily, provided with variable valve timing (VVT), cam profile switching (CPS), and a manifold absolute pressure booster, such as a turbocharger, compressor etc. However, the general principle of the invention as claimed is also applicable to, for instance, stationary aspirating engines with fixed valve timing and a standard camshaft. Such engines are often operated at fixed speeds and loads and are not subject to the transients normally occurring in, for instance, engines for vehicles. Hence a stationary engine can be operated continuously in HCCI-mode.

Also, although the following examples relate to gasoline fuels, an engine operating according to principles of the invention can be adapted to use most commonly available fuels, such as diesel, kerosene, natural gas, and others.

A reciprocating piston is arranged in each engine cylinder whose compression action causes a mixture of air and gasoline fuel within the combustion chamber to be ignited. Gas exchange is controlled by at least one inlet valve preferably, but not necessarily, provided with variable valve timing per cylinder for admitting a combustible gas, such as air, and at least one exhaust valve preferably, but not necessarily, provided with variable valve timing per cylinder for exhausting combusted gases.

The combustion process is monitored by sensors for measuring engine knocking and combustion stability. The knock sensor can be of the piezo-electric type, which may also be used for continuous monitoring of cylinder pressure. The combustion stability sensor may be an acceleration type sensor, such as a flywheel sensor, or an ion current sensor. Alternatively, both said sensors can be replaced by a single in-cylinder piezoelectric pressure sensor. By processing the output from such a sensor, it is possible to obtain a signal representing engine knock and a signal representing engine stability.

The engine is possible to be operated on homogeneous charge compression ignition (HCCI) combustion mode. This is a combustion mode, different than conventional spark ignited (SI) combustion mode, in order to reduce fuel consumption in combination with ultra low NOx emissions. In this mode, a mixture containing fuel, air and combustion residuals is compressed with a compression ratio between 10.5 and 13 to auto ignition. The HCCI combustion has no or a very slow moving flame front, in contradiction to a SI combustion that has a moving flame front. The lack of a flame front reduces temperature and increases the heat release rate hence increases the thermal efficiency of the combustion. The stoichiometric mixture must be diluted with access air and or residuals in order to reduce the heat release rate. This reduces both pumping losses and combustion temperature hence the fuel consumption compared to an SI operated engine. The combustion residuals are captured when operating the engine with a negative valve overlap.

Residuals increase the temperature of the mixture so that the auto ignition temperature is reached before piston top dead center (TDC) and dilute the mixture so that the heat release rate decreases to an acceptable level. By controlling the heat release, cycle-to-cycle variations (COV), noise and knocking combustion can be reduced. The negative valve overlap is achieved when the exhaust valve is closed before piston TDC and the inlet valve is opened after piston TDC in the gas exchange phase of the combustion, as illustrated in FIG. 2.

The acquired valve timing for the negative overlap can be achieved by using suitable fully or partially variable valve systems (VVT), and CPS, hence switching from conventional SI valve timing to HCCI valve timing with a shorter the valve opening duration and/or valve lift.

An engine according to the invention uses a gasoline internal combustion engine provided with at least one cylinder and arranged to be switched between spark ignition mode and compression ignition mode. The engine comprises a fuel injector, through which gasoline fuel is injected into a combustion chamber, for each cylinder and a fuel injection control unit that controls gasoline fuel injection quantity per combustion cycle injected through each fuel injector. Fuel injection is achieved by means of direct injection (DI) into each combustion chamber.

A split fuel injection is used having a pilot direct fuel injection before TDC during the negative valve overlap and a main (larger fuel amount) direct fuel injection after TDC of the negative valve overlap. The fuel of the pilot injection will react, forming intermediates or combustion products. This reaction can be exothermic hence heating the residuals, resulting in earlier timing of the auto ignition temperature. A spark may be sustained in HCCI mode in order to keep the spark plug from fouling and, although the gas mixture is arranged to self ignite, contribute to an increased combustion stability and avoidance of misfire.

In one preferred embodiment, an internal combustion engine is provided with at least one cylinder and includes a fuel injection system having at least one fuel injector, through which fuel is injected into a combustion chamber, for each cylinder, and a control unit for controlling the fuel injection system and a spark ignition system. The engine further includes one piston per engine cylinder whose compression action causes a mixture of air and fuel within the combustion chamber to be ignited, at least one inlet valve for admitting gas which includes fresh air into said cylinder, and at least one exhaust valve for exhausting combusted gases from said cylinder. At least one sensor for measuring an engine operation parameter may also be provided.

During compression ignition mode, the exhaust valve is arranged to be closed before top dead centre during an exhaust stroke of the piston and the intake valve is arranged to be opened after top dead centre during an induction stroke of the piston, in order achieve a negative valve overlap to retain residual exhaust gas. The control unit may be arranged to control the fuel injection system so as to perform a first fuel injection in the interval after the closing of the exhaust valve and before top dead centre of a subsequent piston exhaust stroke and to perform a subsequent, first combustion during the negative valve overlap. In addition, the control unit may be arranged to control the fuel injection system so as to perform a second fuel injection before top dead centre of the piston compression stroke and to perform a subsequent, second combustion prior to compression ignition.

In the following text the first injection or injections will generally be referred to as a pilot injection, while any subsequent injection will be referred to as a post injection.

The pilot or first fuel injection occurs in the interval between closure of the exhaust valve and top dead centre of the piston exhaust stroke. Said pilot injection may be a single second injection or comprise two or more injections. The total amount of the pilot injection always exceeds the amount injected in the post injection. At least one further fuel injection occurs during the compression stroke, but before top dead centre of said compression stroke. As stated above, the second injection occurs after the pilot injection and is referred to as a post injection. The quantity of the second injection is greater than zero but less than 50% of the total amount of injected fuel.

According to the invention, an efficient triple combustion is generated when the engine is operated at low load conditions in HCCI-mode. In order to achieve this, a first part of the fuel is injected after exhaust valve closing but before TDC of the negative valve overlap, as described above. In this way, a large amount of fuel is combusted, or oxidized in an exothermic reaction, to perform a first combustion step to release heat in the negative valve overlap. Fuel that is not oxidized is cracked in order to auto-ignite easier in the subsequent main compression stroke.

The fuel injection pressure is normally in the order of about 100 bar. When in the post injection mode it could be beneficial to lower the fuel-pressure during the post injection to about 35 bar in order to keep the fuel close to the spark-plug. According to one embodiment, the post injection fuel is preferably, but not necessarily, injected at a lower pressure than that of the pilot injection. According to an alternative embodiment, both the pilot and post injections are performed at a pressure that is lower than said normal pressure. This function may be achieved by using a rate shaping injector controlled by the engine control unit. The pressure reduction level is limited by smoke and NOx emissions. In the hot mixture environment the fuel spray evaporates very fast, whereby small fuel droplets and fuel vapour are pushed away from the spark-plug by the fuel spray initiated air motion. Lowering the fuel pressure reduces the penetration length of the spray and creates larger droplets requiring more time to evaporate, so that the fuel is more concentrated in the vicinity of the spark-plug. It is difficult to lower the fuel pressure within one engine cycle so the pilot and post injections may have the same fuel-pressure. In general, lowering of the fuel pressure gives friction benefits.

According to a further preferred embodiment, the second combustion is a stratified combustion of a relatively small post fuel amount The post fuel amount may be injected early in the compression stroke, typically between 60 to 20 crank angle degrees (CAD) before TDC, and with a spark occurring close to the end of injection to initiate the combustion. In this way the temperature of the mixture being compressed is elevated in addition to the earlier temperature elevation from the first combustion in the negative valve overlap. This can be achieved while generating almost no $NO_x$ or particulate emissions. The second combustion is followed by auto-ignition prior to TDC of the compression stroke to complete the triple combustion cycle.

The amount of fuel injected during first and second injection is determined by the control unit on the basis of combustion phasing and a comparison between predetermined limit values for an engine misfire signal and a combustion stability signal transmitted from said at least one sensor. One such sensor may be an ion current sensor. In addition to using control of the amount of fuel injected during first and second injection, the combustion phasing may also be controlled by manipulating the excess oxygen level during negative valve overlap. The excess oxygen level can be controlled by changing the exhaust valve closing timing and/or the intake valve opening timing.

Because of changing engine operation behaviour, the HCCI operational window borders are not fixed, but float, depending on a number of variables indicated by sensors for monitoring various engine operating conditions. The HCCI operational window borders define the limits at which the engine switches from HCCI-mode to SI-mode. Various injection strategies are used within the HCCI operational window to control the combustion phasing, that is the timing of the auto-ignition combustion. In order to maintain stable combustion in HCCI-mode, load threshold values are calculated in order to indicate the size of the combustion phasing control window.

When a sensor detects a combustion phasing close to the earliest possible phasing, then the load threshold value is small for a load increasing demand and large for a load decreasing demand. The earliest possible phasing may be determined by e.g. a knocking threshold or a set-value. In this context, a set-value is a predetermined value for the latest, or earliest, allowed phasing and may be used under conditions when no engine knock signal is generated. For example: a too early phased combustion, albeit very inefficient, may not generate any engine knock during low load conditions. When the control unit and/or a sensor detects a combustion phasing close to the latest possible phasing, then the load threshold value is large for a load increasing demand and small for a load decreasing demand. The latest possible phasing may be determined by e.g. a knocking threshold, a cycle-to-cycle threshold value or a predetermined set-value.

If the load demand exceeds the load threshold value then a mode-switch strategy between HCCI and SI is activated in cases where the operational window borders are crossed. If the load demand exceeds the threshold value without crossing the operational window borders, then the injection strategy is changed. If the demand does not exceed the load threshold value, engine parameters such as fuel quantity are set directly by the engine control unit. The threshold value may be related to a certain percentage of the load. When the injection strategy is determined, the engine parameters such as valve-timing, fuel quantity, timing, spark timing, fuel pressure etc. are set.

Similar to the HCCI operational window borders defined above, the load threshold values between adjacent load regions, or injection strategies, are not fixed, but can be floating depending on load and combustion phasing related variables. These variables may be indicated by sensors for monitoring various engine operating conditions.

Sensors used for determining the knocking or cycle-to-cycle threshold values can be combustion phasing indicators, such as cylinder pressure sensor or indicator, but also derivatives of ion-current measurements, NOx emissions indicating devices, lambda sensors, knock indicating devices or cycle-to-cycle variation indicators.

The above advantages and other advantages, and features of the present invention will be readily apparent from the following detailed description of the preferred embodiments when taken in connection with the accompanying drawings, and from the claims.

BRIEF DESCRIPTION OF DRAWINGS

In the following text, the invention will be described in detail with reference to the attached drawings. These drawings are used for illustration only and do not in any way limit the scope of the invention. In the drawings.

PREFERRED EMBODIMENT(S) OF THE INVENTION

Figure 1:
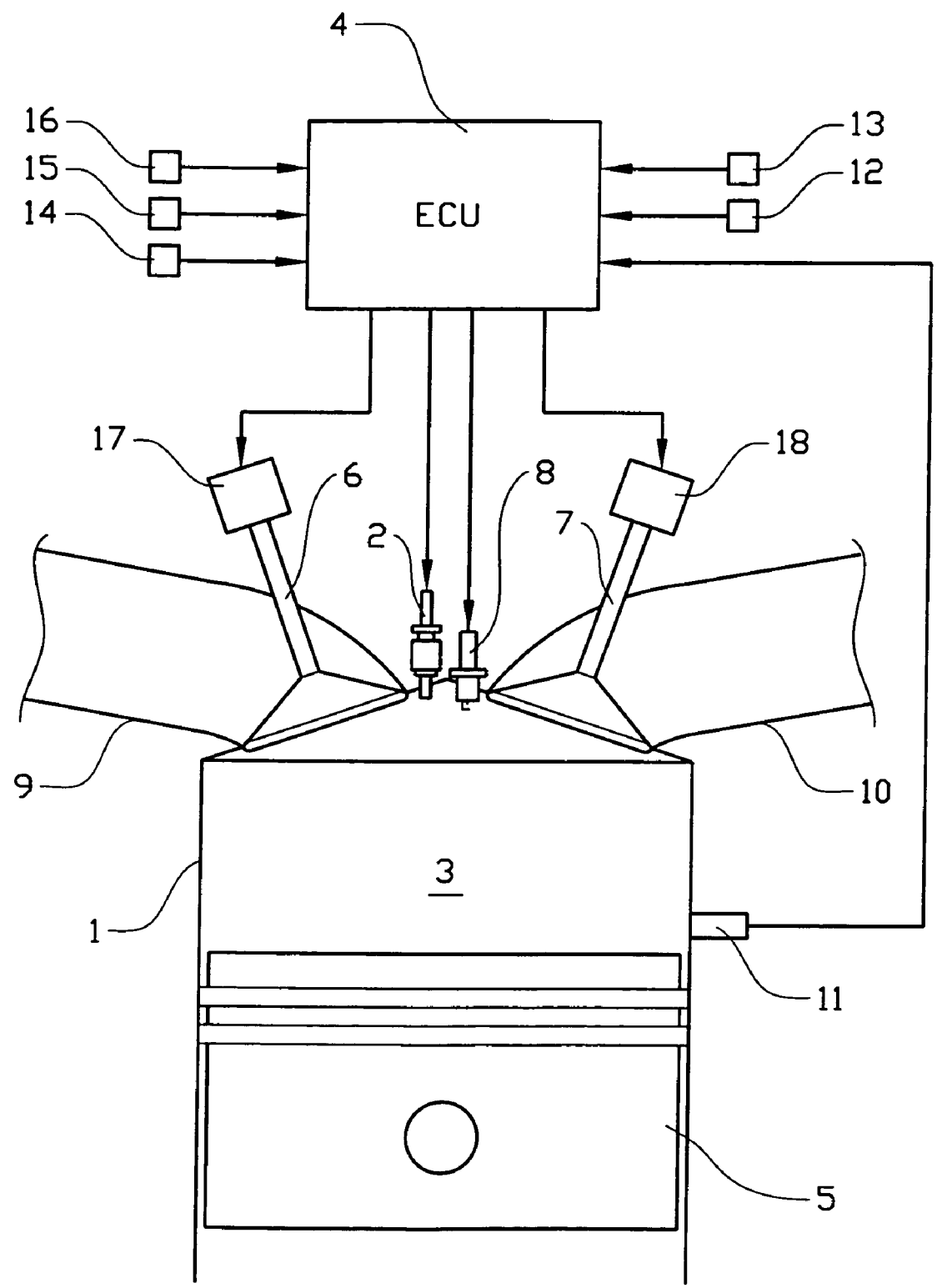
FIG. 1 shows a schematic internal combustion engine according to the invention.

FIG. 1 shows a schematic illustration of an internal combustion engine according to the invention. The engine is provided with at least one cylinder 1 and comprises a fuel injector 2, through which fuel is injected into a combustion chamber 3, for each cylinder. A fuel injection control unit 4 controls fuel injection quantity per combustion cycle injected through each fuel injector. A piston 5 in the engine cylinder has a compression action that causes a mixture of air and fuel within the combustion chamber to be ignited during HCCI-mode. The cylinder is provided with at least one inlet valve 6 for admitting gas which includes fresh air into said cylinder and at least one exhaust valve 7 for exhausting combusted gases from said cylinder. Air is supplied through an intake conduit 9 connected to an intake manifold, while exhaust gas is exhausted through an exhaust conduit 10. During SI-mode, the ignition of the fuel/air mixture is ignited by a spark plug 8.

The control unit receives signals from at least one sensor for measuring engine operation parameters, which sensors include a combustion chamber pressure sensor 11, an intake manifold pressure sensor 12 and a λ-probe 13 in the exhaust conduit, as well as temperature sensors for intake air 14, engine coolant 15 and engine oil 16. The control unit controls the intake and exhaust valves 6, 7 by means of valve actuators 17, 18. The actuators may be either electrically or mechanically operated.

Figure 2:
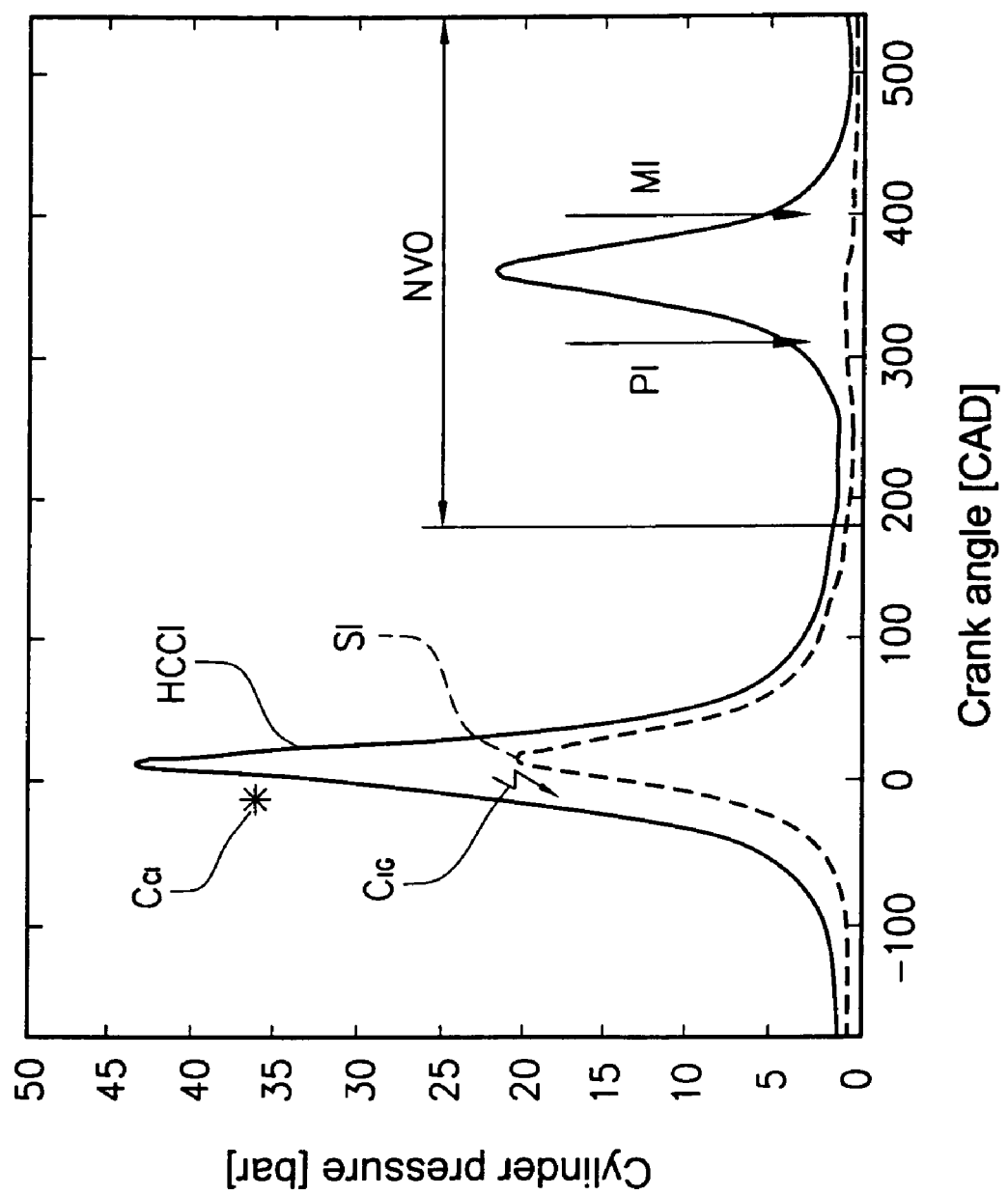
FIG. 2 shows a diagram illustrating the variation of cylinder pressure over crank angle for HCCI- and SI-mode.

FIG. 2 shows a diagram illustrating the variation of cylinder pressure over crank angle for HCCI- and SI-mode. As can be seen from the curves in the diagram, the engine can be operated in homogeneous charge compression ignition (HCCI) combustion mode and in conventional spark ignited (SI) combustion mode. The HCCI combustion has no moving flame front, as opposed to a SI combustion that has a moving flame front. The lack of a flame front reduces temperature and increases the heat release rate hence increases the thermal efficiency of the combustion. This will result in a considerably higher peak pressure after combustion ignition $C_{CI}$, typically in excess of 40 bar, as opposed to about 20 bar after spark ignition $C_{IG}$ in SI mode. The higher pressure in HCCI-mode is also due to the un-throttled engine operation, which results in a relatively high pressure at intake valve closure, denoted IVC. The main difference between the HCCI- and SI modes is that a part of the combustion residuals are captured by operating the engine with a negative valve overlap. The negative valve overlap NVO is achieved by closing the exhaust valve, denoted EVC, before piston top dead centre TDC and opening the inlet valve, denoted IVO, after piston top dead centre TDC in the gas exchange phase of the combustion, as illustrated in FIG. 2. During the air intake phase, residuals increase the temperature of the mixture so that the auto ignition temperature is reached before piston TDC and dilutes the mixture so that the heat release rate decreases to an acceptable level. By controlling the heat release, noise and knocking combustion can be reduced.

During normal load in HCCI-mode, a split fuel injection is used having a pilot direct fuel injection PI before TDC during the negative valve overlap and a main direct fuel injection MI after TDC of the negative valve overlap. The relative quantities of fuel injected during the pilot and the main injections can be varied and are calculated and controlled by a fuel injection control unit (not shown). The fuel of the pilot injection PI will react in the retained residuals, forming radicals, intermediates or combustion products. This reaction can be exothermic hence heating the residuals, resulting in earlier timing of the auto ignition temperature. A prerequisite for this reaction is the presence of excess oxygen, without which the reaction will stop before it is completed. When the engine is operated in HCCI-mode the control unit must adjust the value of λ to be sufficiently high for all engine operating conditions to ensure this. The total quantity of injected fuel for the pilot and the main injection is substantially constant with respect to the current engine operating conditions, such as engine speed, engine load and efficiency. The quantity of the first injection is selected to be in the range of 0<PI<50% of the total amount of injected fuel.

Due to the demand for dilution, which controls the rate of heat release, only the part load regime of the engine is used for HCCI combustion mode. The auto ignition timing for HCCI operation can be controlled by the pilot fuel injection and/or the captured amount of residuals and/or the absolute manifold pressure. The latter may be controlled by increasing the pressure of the intake air by means of a compressor or turbocharger.

When operating the engine in HCCI-mode at low load, low combustion stability and a high noise level has to be avoided. Misfire, which is also a source of noise and vibration, is detected by measuring the peak pressure, pressure variations caused by a too rapid heat release during the expansion phase and/or by ion current sensing.

Figure 3:
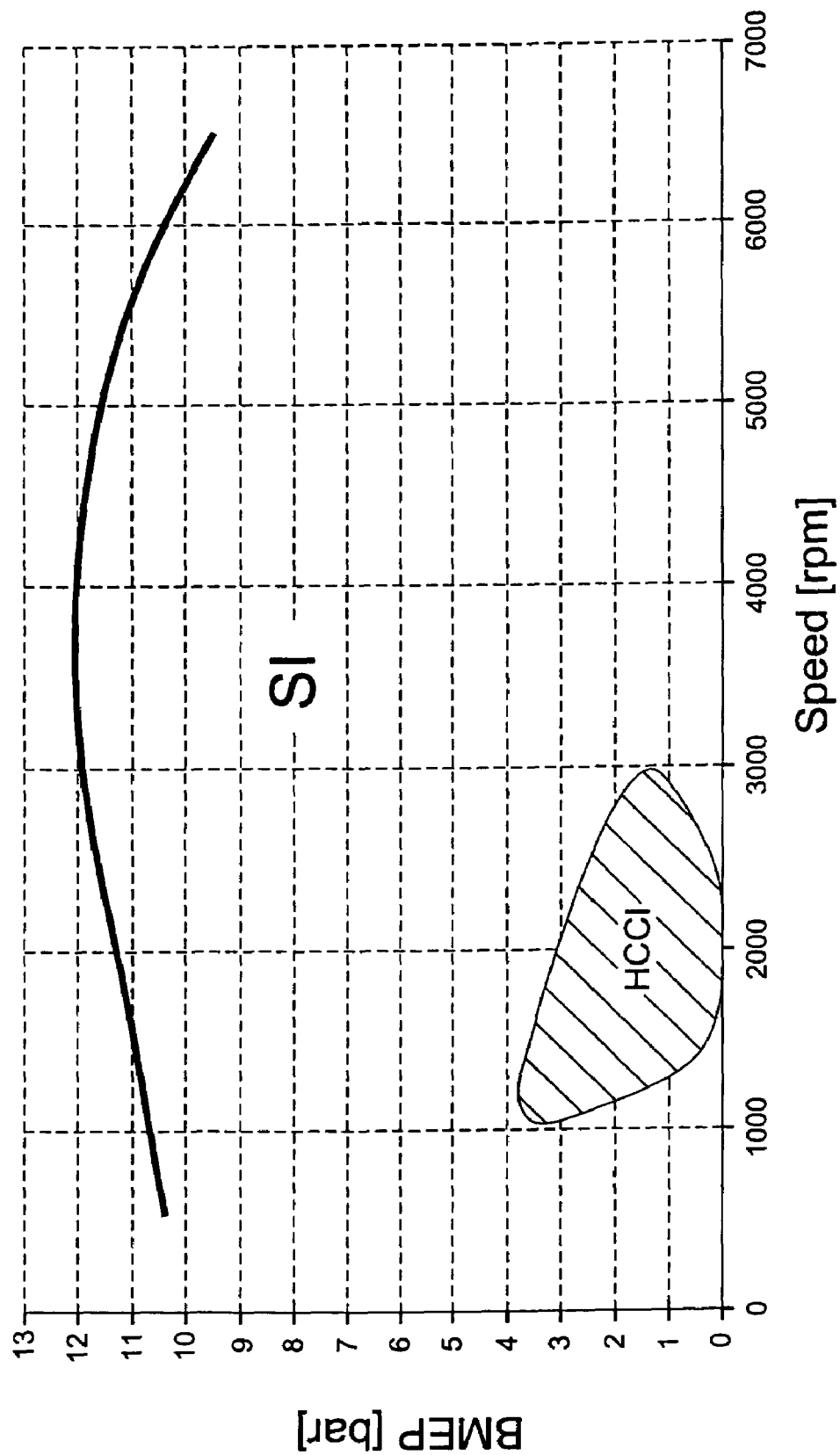
FIG. 3 shows a diagram illustrating the operating range of an engine in SI- and HCCI-mode respectively.

FIG. 3 shows a diagram illustrating the operating range of an engine in HCCI-mode. The diagram shows a map of brake mean effective pressure BMEP (bar) over engine speed n (rpm) for engines operated in spark ignition or SI-mode and in HCCI-mode respectively. The hatched area indicates the possible area of operation for an engine in HCCI-mode at normal load. As this area is relatively restricted, it is desirable to expand it into, for instance, the low load region generally indicated by A in the diagram. This region is indicated more clearly in FIG. 4, which shows a schematic mapping of load, or torque, as a percentage of maximum torque over engine speed (rpm) for an engine operated in HCCI-mode. The load regions represented by areas A, B and C in FIG. 4 illustrates an approximate area of operation for an engine in HCCI-mode.

Figure 4:
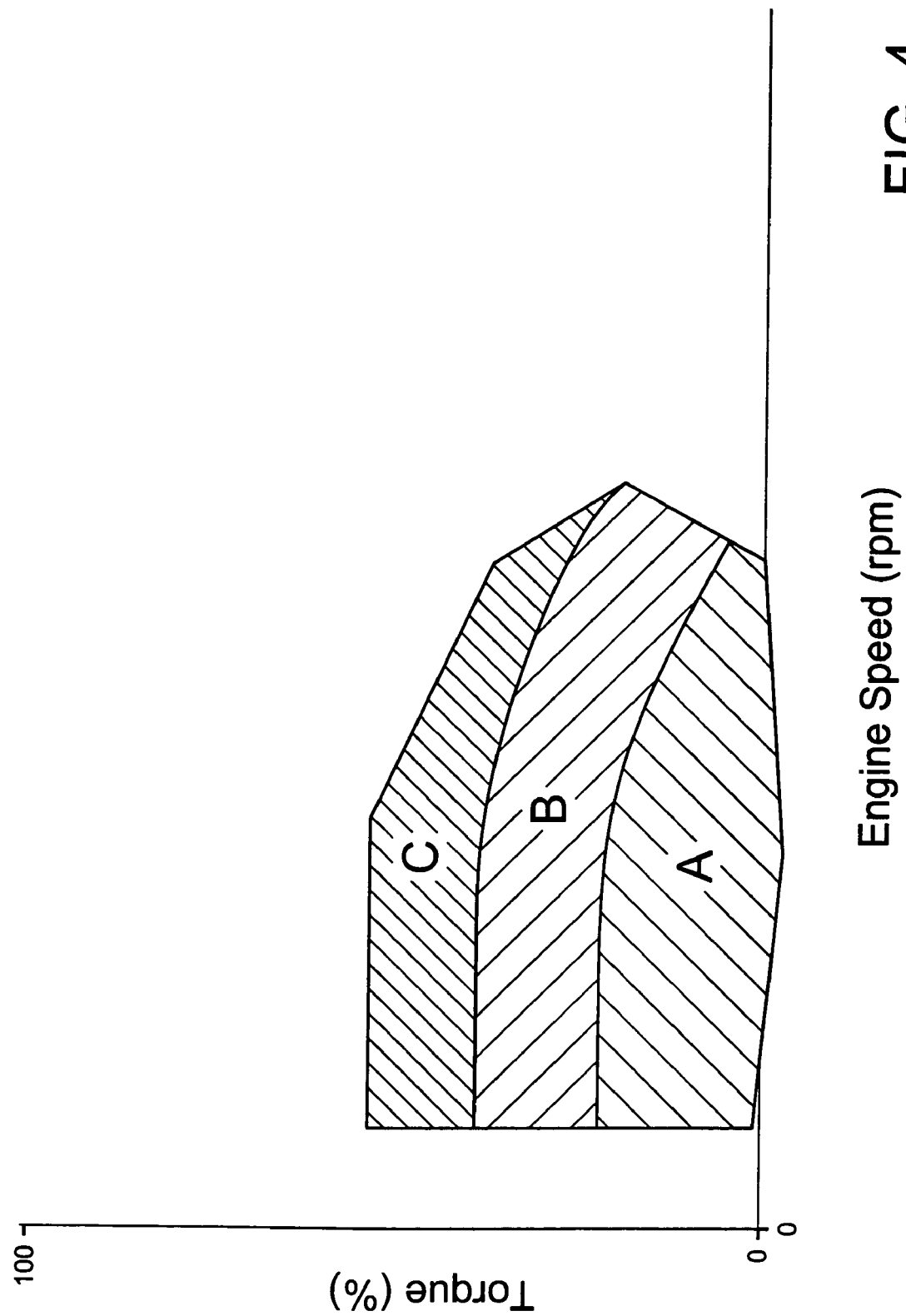
FIG. 4 shows a diagram illustrating the variation of cylinder pressure over crank angle for HCCI-mode.

In operation, the engine is switched between the predetermined injection strategies $S_A$, $S_B$ and $S_C$ when engine operating conditions require load changes between the different regions A, B and C, shown in FIG. 4.

For example, if a load decreasing demand is detected by the engine control unit for an engine operating in region B, then sensor readings from cylinder pressure sensor and/or ion-current sensors are used for detecting the instantaneous combustion phasing and calculating current load threshold values.

If a sensor detects a combustion phasing close to the earliest possible phasing, then the load threshold value is large for a load decreasing demand. The earliest possible phasing is determined by a knocking threshold or a set-value. A set-value is a predetermined value for the latest, or earliest, allowed phasing and may be used under conditions when no engine knock signal is generated. If a sensor detects a combustion phasing close to the latest possible phasing, then the load threshold value is small for a load decreasing demand. The latest possible phasing is determined by a cycle-to-cycle threshold value or a predetermined set-value. If the load demand exceeds the current load threshold value without crossing the operational window borders for HCCI-mode, then the injection strategy is changed from strategy $S_B$ to strategy $S_A$. Consequently, the engine control unit has performed a load change from region B to region A.

However, if the demand does not exceed the current load threshold value, engine parameters such as fuel quantity are set directly by the engine control unit and engine operation will continue in region B using injection strategy $S_B$.

Similarly, if a load increasing demand is detected by the engine control unit for an engine operating in region A, then sensor readings from cylinder pressure sensor and/or ion-current sensors are used for detecting the instantaneous combustion phasing and calculating current load threshold values If a sensor detects a combustion phasing close to the earliest possible phasing, then the load threshold value is small for a load increasing demand. The earliest possible phasing is determined by a knocking threshold or a predetermined set-value. If a sensor detects a combustion phasing close to the latest possible phasing, then the load threshold value is large for a load increasing demand. The latest possible phasing is determined by a cycle-to-cycle threshold value or a predetermined set-value. If the load demand exceeds the current load threshold value without crossing the operational window borders for HCCI-mode, then the injection strategy is changed from strategy $S_A$ to strategy $S_B$. Consequently, the engine control unit has performed a load change from region A to region B.

However, if the demand does not exceed the current load threshold value, engine parameters such as fuel quantity are set directly by the engine control unit and engine operation will continue in region A The same operational control is used when performing a load change between regions B and C or regions A and C. The latter condition can occur when the load demand exceeds the current load threshold value by a predetermined amount, requiring a load change from region A directly to region C, or vice versa.

As the HCCI operational window borders are floating and load changes may be required at any time, the load threshold value is calculated continuously by the control unit. Alternatively, load threshold values are calculated when a change in torque or load demand is detected. In this example, the load threshold value is related to a certain percentage of the load. When the injection strategy is determined, the engine parameters such as valve-timing, fuel quantity, timing, spark timing, fuel pressure etc. are set using mapped values stored in the engine control unit.

A load change where the injection strategy is changed is preferably, but not necessarily, achieved by altering the fuel quantity of the injection containing the largest amount of fuel. For strategy A, comprising a pilot and post injection, it is primarily the pilot fuel amount that is altered for a load change. For strategy B, comprising a pilot and a main injection, it is also the main fuel amount that is changed for a load change. For strategy C, comprising a main fuel injection, it is obviously only the main fuel amount. Additional corrections to the amount of fuel for the pilot and main injection, for combustion phasing and similar, is carried out in a separate control loop.

Sensors used by the control unit for determining the knocking or cycle-to cycle threshold values are combustion phasing indicators, such as cylinder pressure sensor or indicator, or, alternatively, derivatives of ion-current measurements, NOx emissions indicating devices, lambda sensors, knock indicating devices or cycle-to-cycle variation indicators.

Figure 5:
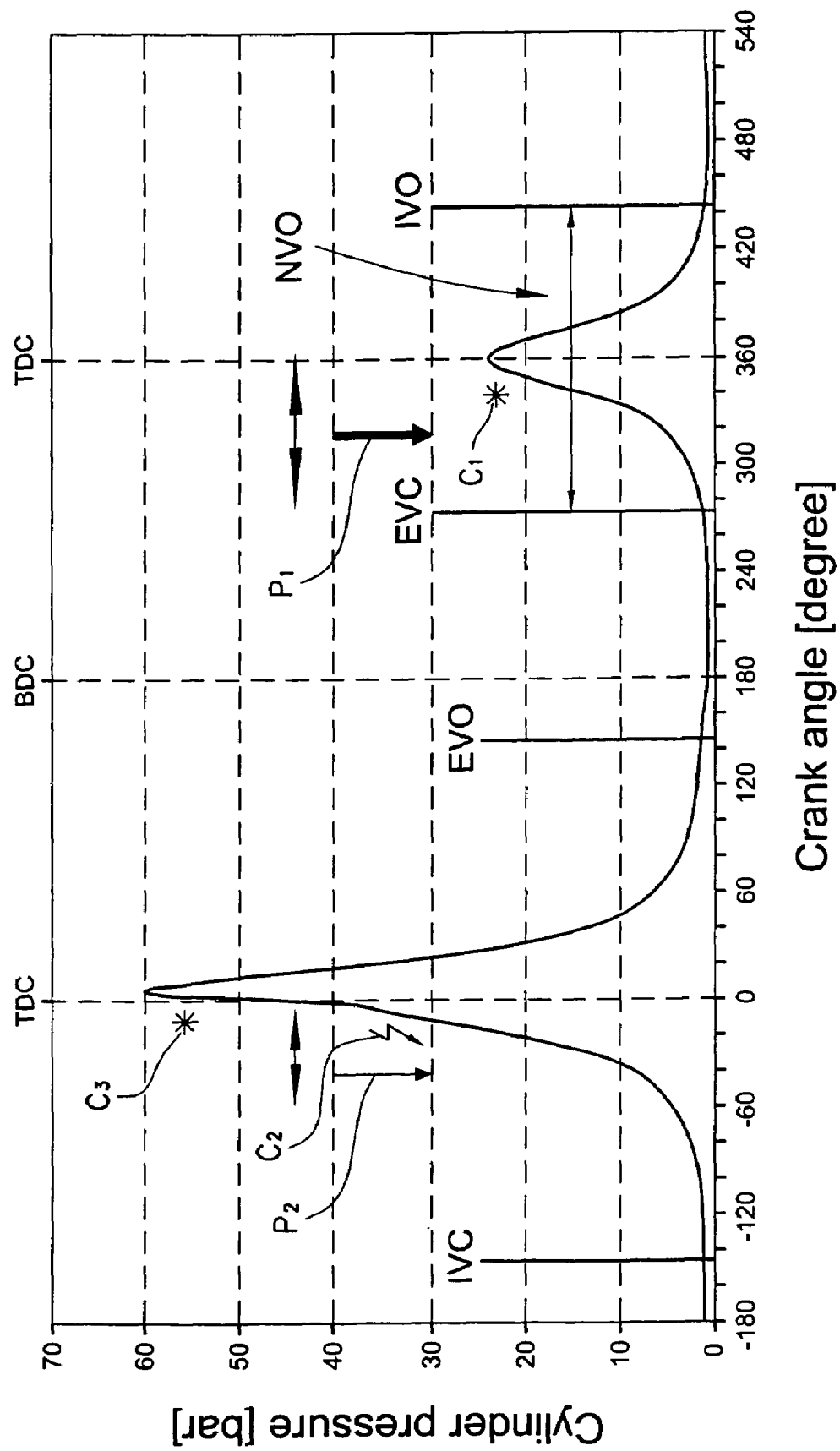
FIG. 5 shows a diagram illustrating the variation of cylinder pressure over crank angle for HCCI-mode for an engine operated in accordance with the invention.

FIG. 5 shows a diagram illustrating the variation of cylinder pressure over crank angle for HCCI-mode for an engine operated in accordance with the invention. When operating the engine in a low load region the opening and closing timings of the inlet valve and the exhaust valve continue to be adjusted so that the piston moving within the cylinder performs an intake phase, a compression phase, an expansion phase, an exhaust phase and an exhaust retaining phase. In this case, the low load region corresponds to region A in FIG. 4. The negative valve overlap NVO is achieved by closing the exhaust valve before TDC during an exhaust stroke of the piston and opening the intake valve after TDC during an induction stroke of the piston. As can be seen from the example in FIG. 5, the exhaust valve is opened during the exhaust stroke at approximately 150° after TDC for the main combustion and closed at approximately 280° after TDC. Subsequently, the intake valve is opened during the induction stroke at approximately 440° after TDC for the main combustion and closed at approximately 580° after TDC. These crank angle degrees are counted from TDC for the main combustion at the beginning of the expansion stroke and said angles can be varied by the control unit (see FIG. 1) at any time during the operating cycle.

At the same time, the timing of the pilot fuel injection $P_1$ is switched so that a first fuel injection occurs during the negative overlap, before top dead centre following the expansion stroke. As indicated by the horizontal arrow adjacent the pilot injection $P_1$ the timing of this injection can be varied. This injection causes a first combustion $C_1$ in which fuel reacts with excess oxygen in the retained exhaust gas from the previous combustion. The first combustion $C_1$ is an exothermic reaction that releases heat in the negative valve overlap. Fuel that is not oxidized is cracked in order to auto-ignite easier in the subsequent main compression stroke. The fuel injection control unit then performs a second, or post fuel injection $P_2$ occurs before top dead centre of the piston compression stroke, followed by a spark ignited, second combustion $C_2$. The post injection $P_2$ occurs at approximately 50° before TDC in the example shown in FIG. 5. However, as indicated by the horizontal arrow adjacent the post injection $P_2$ the timing of this injection can be varied between 20° and 60° before TDC.

The post injection fuel is preferably injected at a lower pressure than that of the pilot injection. Alternatively, if such a pressure reduction is not allowed by the type of fuel injectors used, both the pilot and post injections are performed at a lower pressure. The fuel injection pressure is normally in the order of about 100 bar. In the current example, using pilot and post fuel injections it would be beneficial to lower the fuel-pressure to about 35 bar in order to keep the fuel close to the spark-plug. In this way the penetration of the fuel spray or jet into the cylinder volume is decreased and the pilot fuel is kept relatively close in the periphery of the spark. The density of the residual gas against which the pilot fuel amount is injected is relatively low, making a fuel pressure decrease possible. The period between start and end of injection is adjusted in order to maintain load. The second combustion $C_2$ is a spark assisted stratified combustion of a relatively small post fuel amount, whereby the control unit generates a spark at or close to the end of the post injection $P_2$. The post fuel amount is dependent on the load. For instance, when the engine is idling, the pilot and post fuel amounts are approximately the same. At higher loads, the post fuel amount will be less than or in the order of the post fuel amount at idling.

The second combustion $C_2$ releases further heat prior to a third combustion $C_3$, caused by the combined heat release of the first and second combustion steps and the compression subsequent to the second combustion. The main compression auto-ignition $C_3$ occurs immediately prior to TDC at the end of the compression stroke. If required, the control unit can be arranged to sustain a spark during compression ignition combustion. The auto-ignition combustion $C_3$ adjacent to the TDC of the compression stroke, following the first and second combustion steps $C_1$, $C_2$, completes the triple combustion cycle.

Figure 6:
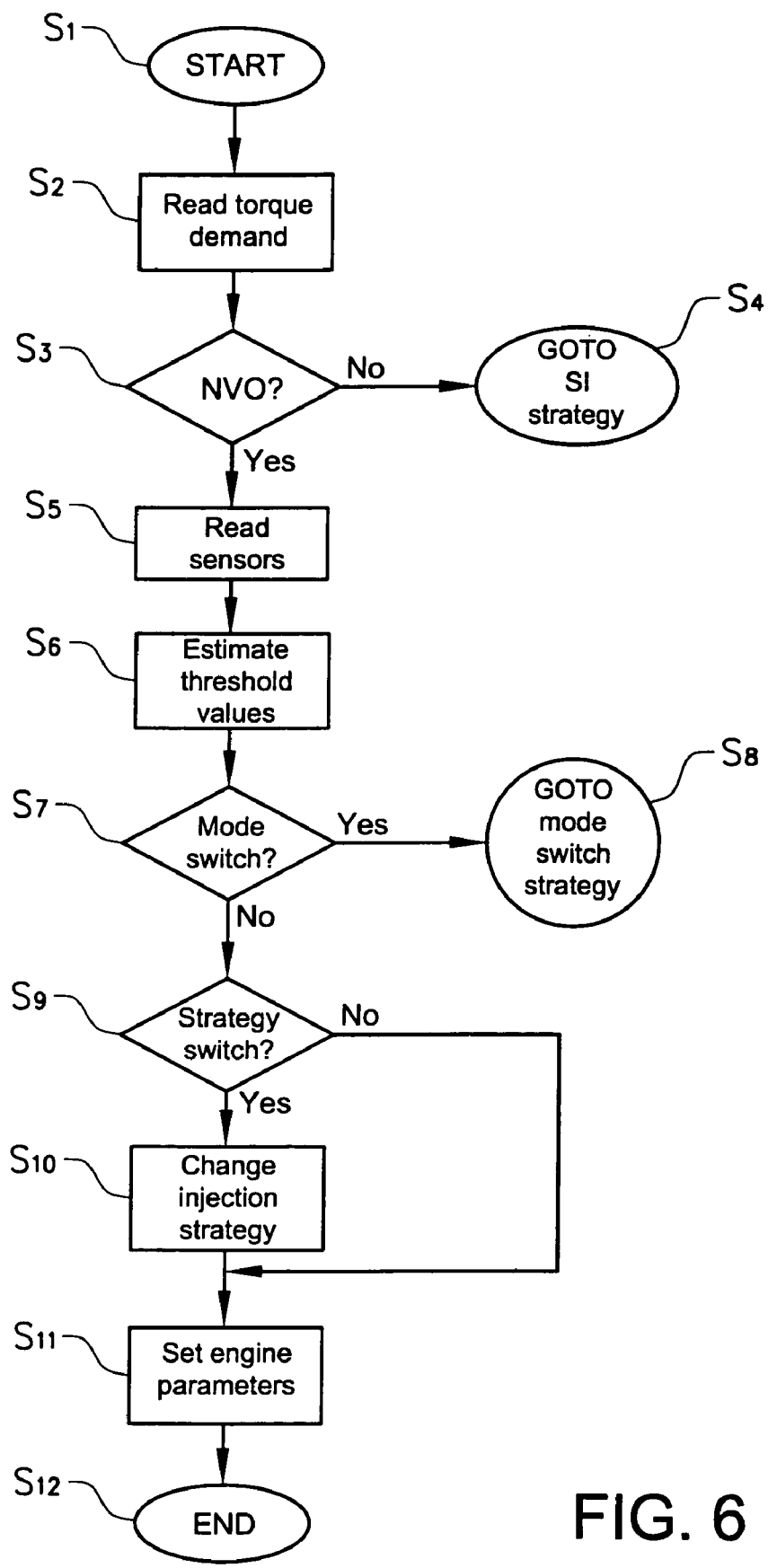
FIG. 6 shows a flow chart indicating the HCCI-mode operation of an engine according to the invention.

FIG. 6 shows a flow chart indicating the HCCI-mode operation of an engine according to the invention. As can be seen from the flow chart, operation is initiated at step $S_1$, where a control loop is started. The control loop can be run continuously, or be triggered by a predetermined change in torque demand. In a second step $S_2$ a current value of torque demand is read by the engine control unit. At this point and a third step $S_3$ determines whether the engine is operated in HCCI- or SI-mode. If a negative valve overlap NVO exists, then the engine is operated in HCCI-mode, as described in FIG. 5. If there is no negative valve overlap, then HCCI-mode operation is not possible. The control unit then activates a control strategy for SI-mode in a fourth step $S_4$.

If there is a negative valve overlap, then HCCI-mode operation is possible and the control unit proceeds to a fifth step $S_5$, where a number of readings are taken from sensors to determine the current combustion phasing.

Examples of sensors used by the control unit for determining the knocking or cycle-to cycle threshold values are combustion phasing indicators, such as cylinder pressure sensor or indicator, or, alternatively, derivatives of ion-current measurements, $NO_x$, emissions indicating devices, lambda sensors, knock indicating devices or cycle-to-cycle variation indicators. These reading are used to calculate a current load threshold value for torque demand in a sixth step $S_6$.

In a seventh step $S_7$, it is determined if the load demand exceeds the current load threshold value with or without crossing the operational window borders for HCCI-mode. If said operational window borders are crossed, then the control unit switches to a separate mode switch strategy (not described here) in an eight step $S_8$ to determine whether HCCI-mode operation is still possible.

If the load demand, irrespective of its relation to the load threshold value, does not cross the operational window borders for HCCI-mode, then the control unit proceeds to a ninth step $S_9$. In this step the load demand is compared to the load threshold value to determine if the injection strategy must be changed or not. If the load demand exceeds the calculated load threshold value, then the control unit proceeds to a tenth step $S_{10}$ where the current injection strategy is changed to an adjacent strategy, e.g from strategy $S_B$ to strategy $S_A$ as described above. Once the new injection strategy has been implemented, the control unit sets the engine parameters for the selected strategy in an eleventh step $S_{11}$. In a final step $S_{12}$ the control loop is ended.

On the other hand, if the load demand does not exceed the calculated load threshold value, then the current injection strategy is maintained. In this case the current injection strategy is maintained and the control unit proceeds directly to step $S_{11}$ to set the engine parameters, whereby the control loop is ended at step $S_{12}$.

The invention is not limited to the embodiments described above and may be varied freely within the scope of the appended claims.

The invention claimed is:

1. An internal combustion engine, comprising:
    at least one cylinder, comprising:
        a combustion chamber;
        a piston whose compression action causes a mixture of air and fuel within said combustion chamber to be ignited;
        at least one inlet valve for admitting gas which includes fresh air into said cylinder;
        at least one exhaust valve for exhausting combusted gases from said cylinder;
    a fuel injection system comprising at least one fuel injector, through which fuel is injected into said combustion chamber of said cylinder;
    at least one sensor for measuring an engine operation parameter; and
    a controller for controlling said fuel injection system and said spark ignition system to achieve a desired combustion phasing, such that during compression ignition mode, while using a first fuel injection strategy, said exhaust valve is arranged to be closed before top dead center during an exhaust stroke of said piston and said intake valve is arranged to be opened after top dead center during an induction stroke of said piston therefore achieving a negative valve overlap to retain residual exhaust gas, said controller further controlling said fuel injection system so as to perform a first fuel injection in the interval after the closing of said exhaust valve and before top dead centre of a subsequent piston exhaust stroke and to perform a first combustion during the negative valve overlap before top dead centre of the piston exhaust stroke, and performing a second fuel injection before top dead centre of the piston compression stroke and a subsequent, second combustion prior to a third combustion comprising a compression ignition.

2. The internal combustion engine according to claim 1, wherein said first injection is a pilot injection and said second injection is a post injection.

3. The internal combustion engine according to claim 2, wherein the quantity of the second injection is greater than zero but less than 50% of the total amount of injected fuel.

4. The internal combustion engine according to claim 2, wherein at least the second injection is performed at a reduced fuel pressure.

5. The internal combustion engine according to claim 1, wherein said controller is arranged to provide a spark to initiate the second combustion.

6. The internal combustion engine according to claim 5, wherein the second combustion is a stratified combustion.

7. The internal combustion engine according to claim 1, wherein the amount of fuel injected during first and second injection is determined by said controller on the basis of combustion phasing and a comparison between predetermined limit values for an engine misfire signal and a combustion stability signal transmitted from said at least one sensor.

8. The internal combustion engine according to claim 7, wherein said sensor is an ion current sensor.

9. The internal combustion engine according to claim 1, wherein during compression ignition mode, said controller is arranged to switch between said first fuel injection strategy and at least one further fuel injection strategy in response to a change in load demand on the engine.

10. The internal combustion engine according to claim 9, wherein said controller is arranged to switch fuel injection strategy when the change in load demand exceeds a load threshold value.

11. The internal combustion engine according to claim 10, wherein said controller is arranged to calculate a separate load threshold value for increasing and decreasing load demand.

12. The internal combustion engine according to claim 11, wherein said load threshold values are dependent on the current combustion phasing.

13. The internal combustion engine according to claim 12, wherein said load threshold values controlling switching between injection strategies are floating.

14. A method for operating an internal combustion engine having at least one cylinder, the cylinder having a combustion chamber, a piston and at least one each of an inlet and exhaust valve, the engine operable in compression ignition mode, the method comprising:
    closing the exhaust valve before top dead center during an exhaust stroke of the piston and opening the intake valve after top dead center during an induction stroke of the piston; and
    performing a first fuel injection before top dead center of the expansion stroke, and performing a first combustion during the negative valve overlap before top dead centre of the piston exhaust stroke in which fuel reacts with excess oxygen from the previous combustion, and performing a second fuel injection before top dead centre of the piston compression stroke and performing a subsequent, second combustion prior to a third combustion comprising a compression ignition.

15. The method according to claim 14, wherein said first injection is a pilot injection and said second injection is a post injection.

16. The method according to claim 15, wherein the quantity of said second injection is greater than zero but less than 50% of the total amount of injected fuel.

17. The method according to claim 15, wherein the fuel pressure for at least the second injection is reduced.

18. The method according to claim 14, further comprising controlling the controller to provide a spark to initiate the second combustion.

19. The method according to claim 14, further comprising performing the second combustion as a stratified combustion.

20. The method according to claim 14, further comprising said controller performing a switch between said first fuel injection strategy and at least one further fuel injection strategy in response to a change in load demand on the engine.

21. The method according to claim 20, further comprising switching fuel injection strategy when the change in load demand exceeds a load threshold value.

22. The method according to claim 21, further comprising calculating a separate load threshold value for increasing and decreasing load demand.

23. The method according to claim 22, wherein the load threshold values are dependent on the current combustion phasing.

24. The method according to claim 23, wherein the load threshold values controlling switching between injection strategies are floating.

* * * * *